United States Patent [19]

Vetter

[11] 4,442,666
[45] Apr. 17, 1984

[54] FUEL FIRE RESISTANT MOTOR

[75] Inventor: Ronald F. Vetter, Ridgecrest, Calif.

[73] Assignee: The United States of America as represented by the Secretary of the Navy, Washington, D.C.

[21] Appl. No.: 435,819

[22] Filed: Oct. 21, 1982

[51] Int. Cl.³ .............................................. F02K 9/00
[52] U.S. Cl. ..................... 60/39.47; 60/253; 89/1.812; 102/290
[58] Field of Search ............... 60/39.09, 39.47, 253, 60/254, 255; 89/1.812; 102/290

[56] References Cited

U.S. PATENT DOCUMENTS

| | | | |
|---|---|---|---|
| 3,052,091 | 9/1962 | D'Ooge | 60/254 |
| 3,056,260 | 10/1962 | Mosher | 60/39.47 |
| 3,185,036 | 5/1965 | Oeland | 89/1.812 |
| 3,188,802 | 6/1965 | Davies | 102/290 |
| 3,188,962 | 6/1965 | Mosher | 102/290 |
| 3,440,820 | 4/1969 | Caveny | 60/253 |
| 3,673,287 | 6/1972 | Thies et al. | 264/3 |
| 3,700,762 | 10/1972 | Carpenter et al. | 264/3 |
| 4,001,126 | 1/1977 | Marion et al. | 252/62 |

*Primary Examiner*—Louis J. Casaregola
*Attorney, Agent, or Firm*—R. F. Beers; W. Thom Skeer

[57] ABSTRACT

The invention describes a rocket motor having a thermal barrier around a missile casing with gaps along the side to permit initial burning on the outer portion of the grain at rupture of the casing and venting prior to burning over the inner bore to avoid explosion.

6 Claims, 1 Drawing Figure

FUEL FIRE RESISTANT MOTOR

BACKGROUND OF THE INVENTION

1. Field of the Invention

This invention relates to airframe design. More particularly, this invention relates to solid fuel rocket motors. By way of further characterization, the invention relates to a solid fuel rocket motor which has improved immunity to destructive fires during storage prior to firing. Still more particularly, the invention will be described as it pertains to rocket motors having resistance to fuel fires external thereto.

2. Description of the Prior Art

Navy carrier operations provide the potential for aircraft fuel fires to occur in the vicinity of weapons and ordnance. Many in-fleet rocket motors react after a brief exposure to enveloping fuel fire flames. The severity of the reaction varies from mild burning, which is acceptable, to violent case rupture.

Past attempts to solve the problem have included placing a thermal barrier on the exterior of the rocket motor casing or warhead in an attempt to thermally insulate the rocket motor propellant or explosive material from fire. This approach increases the length of time the ordnance item may be exposed to a fire without exploding by keeping the internal temperature low. If the fire is not extinguished within a short period of time, the internal temperature will increase and the ordnance item will ignite and explode. Explosion and violent ignition of a heated motor may occur when the propellant grain is ignited along the central void in the grain as is the case during normal motor operation. If combustion can be started from the outside of the grain and properly vented, the severity of the reaction may be lessened.

Thus, a technique of providing a small vent/hole, before propellant ignition occurs over a significant surface area, is required. It has been observed that when ignition commences in such a fashion that a large area vent is produced by enlargement of the small hole due to "torching" of exiting propellant gases. The combustion is mild and controllable. Thus, if the rupture can be induced to occur at a desired location and early in the exposure to the fuel fire, a margin of safety is achieved.

SUMMARY OF THE INVENTION

The present invention is characterized by a rocket motor having a metallic outer casing, a cylindrical propellant grain within said metallic outer casing having a longitudinal central bore having radial grooves extending radially outward from said bore; an insulating layer disposed about the outer side of said metallic casing. A plurality of longitudinally extending gaps in said insulating layer are positioned to overlie the spaces between the radial grooves in the cylindrical propellant grain.

OBJECTS OF THE INVENTION

Accordingly, it is an object of this invention to provide a fire resistant rocket motor.

A further object of this invention is to provide a rocket motor which will fail harmlessly along predetermined stress areas.

A still further object of this invention is to provide a rocket motor which will facilitate fire caused casing failure to produce a controlled venting.

These and other objects of the invention will become apparent to one versed in the art in view of the following description of the preferred embodiment, claims, and drawings, in which like parts have like numbers.

DESCRIPTION OF THE PREFERRED EMBODIMENT

Figure 1:
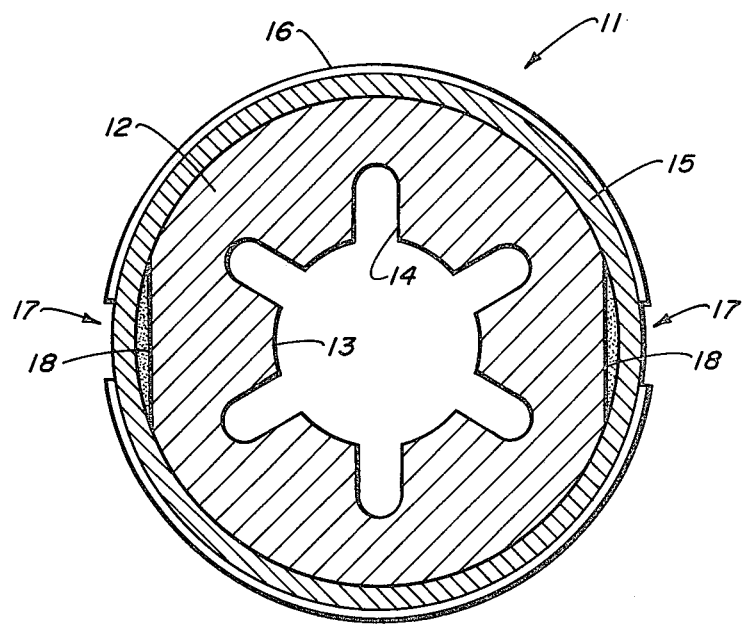
FIG. 1 is a sectional view of the rocket motor according to the invention.

Referring to the drawing, the number 11 indicates generally a rocket motor with a propellant grain 12 contained therein. Grain 12 has a cylindrical bore 13 centrally located therein and a plurality of radially extending grooves 14 which, with bore 13, create a longitudinal void used in the conventional fashion to control the motor burn. Grain 12 is surrounded by a casing wall 15 which has an insulating layer 16 over most of its outer surface. A gap 17 in layer 16 is positioned on either side of motor 11 adjacent a thick portion of grain 12 not incised by grooves 14. This placement will permit a longer burn time for ignition occurring in that region to burn to enlarge any vent hole prior to ignition of the central bore 13.

A layer of insulation 18, which is a heat resistant silicone elastomer is placed behind gap 17 between wall 5 and grain 12. The insulation material could be the type known as DC 93-118 (Reg. TM of Dow Corning), but is not limited to it. Under thermal stress, wall 15 ruptures in the vicinity of gap 17. In operation, when the rocket motor is exposed to fire, the thermal exposure of the uninsulated exterior strip causes case weakening and local stresses and distortions, allows local internal pyrolysis gas pressurization and leads to small holes; the torching growth of these ruptures is such as to generate a large area vent prior to bore 13 ignition.

What is claimed is:

1. A rocket motor comprising:
    a metallic outer casing;
    a cylindrical propellant grain within said metallic outer casing having a longitudinal central bore having radial grooves extending radially outward from said bore;
    an insulating layer disposed about the outer surface of said metallic casing a having a plurality of gaps in said layer preferably positioned to overlie the spaces between said radial grooves; and
    insulating material between said outer casing and said cylindrical propellant grain located adjacent said gaps.

2. A rocket motor according to claim 1 wherein the insulating layer has two gaps diametrically opposed to each other.

3. A rocket motor according to claim 1 wherein the gaps are spaced over maximum propellant web thickness.

4. A rocket motor according to claim 2 wherein the gaps are spaced over maximum propellant web thickness.

5. A rocket motor of claim 1 wherein the internal insulating material is silicone elastomer.

6. A rocket motor of claim 2 wherein the internal insulating material is silicone elastomer.

* * * * *